United States Patent
Kajasvirta et al.

(10) Patent No.: US 10,252,228 B2
(45) Date of Patent: Apr. 9, 2019

(54) METHOD AND DEVICE FOR FEEDING AT LEAST ONE CHEMICAL SUBSTANCE INTO A MAIN PROCESS STREAM

(71) Applicant: BASF SE, Ludwigshafen (DE)

(72) Inventors: Marko Petteri Kajasvirta, Espoo (FI); Frank Breithecker, Neustadt (DE); Joachim Hege, Kleinniedesheim (DE); Christian-Andreas Winkler, Mannheim (DE); Florian Scharf, Frankfurt (DE)

(73) Assignee: BASF SE, Ludwigshafen (DE)

( * ) Notice: Subject to any disclaimer, the term of this patent is extended or adjusted under 35 U.S.C. 154(b) by 246 days.

(21) Appl. No.: 14/423,857

(22) PCT Filed: Aug. 28, 2013

(86) PCT No.: PCT/EP2013/067834
§ 371 (c)(1),
(2) Date: Feb. 25, 2015

(87) PCT Pub. No.: WO2014/033178
PCT Pub. Date: Mar. 6, 2014

(65) Prior Publication Data
US 2015/0209739 A1 Jul. 30, 2015

(30) Foreign Application Priority Data

Aug. 28, 2012 (EP) .................................. 12182040

(51) Int. Cl.
*B01F 5/02* (2006.01)
*B01F 5/00* (2006.01)
(Continued)

(52) U.S. Cl.
CPC .............. *B01F 5/0275* (2013.01); *B01F 3/08* (2013.01); *B01F 3/0865* (2013.01);
(Continued)

(58) Field of Classification Search
CPC ........ B01F 5/0245; B01F 5/0057; B01F 5/04; B01F 5/0403; B01F 5/0498; B01F 15/0254; B01F 3/0865; B01F 5/0275
(Continued)

(56) References Cited

U.S. PATENT DOCUMENTS

| 2,645,463 A | 7/1953 | Stearns |
| 3,761,065 A | 9/1973 | Rich et al. |

(Continued)

FOREIGN PATENT DOCUMENTS

| DE | 22 24 698 A1 | 12/1972 |
| DE | 92 05 111 U1 | 11/1992 |

(Continued)

OTHER PUBLICATIONS

Machine translation of EP 1254699, accessed via https://worldwide.espacenet.com on Jun. 20, 2017.*

(Continued)

*Primary Examiner* — Marc C Howell
(74) *Attorney, Agent, or Firm* — Oblon, McClelland, Maier & Neustadt, L.L.P.

(57) ABSTRACT

The present invention concerns a method and a device for feeding at least one chemical substance into a main process stream. The method of the invention comprises the steps of providing a concentrated stream of said chemical substance, mixing said concentrated stream with a diluent stream to provided a diluted stream of said chemical substance, injecting said diluted stream of said chemical substance into said main process stream, wherein said mixing of said concentrated stream with said diluent stream is effected by injecting a jet of either one of said concentrated stream or said diluent stream into the respective other stream. The device of the invention comprises a first pipe segment (21) having a first inlet (22) for a first fluid and a first outlet (23) for a mixed (Continued)

Figure 1:
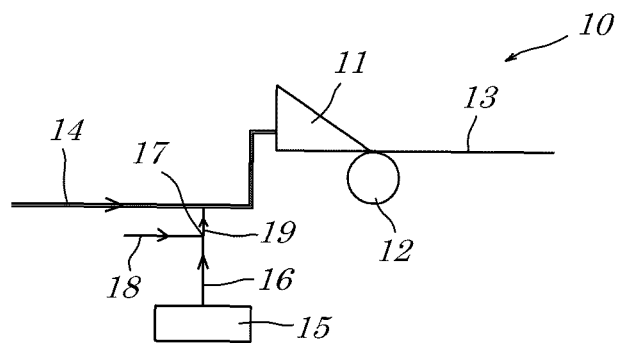

fluid, a second pipe segment (24) having a second inlet (25) for a second fluid and a second outlet (26) connected to and leading into said first pipe segment (21) between said first inlet (23) and said first outlet (24), and first connection means (27) for connecting said first outlet (23) of said first pipe section (21) to a main pipe (14) of said main process stream, wherein said second pipe segment (24) comprises at least one nozzle (28) for generating a jet (29) of said second fluid arranged upstream of said second outlet (26).

11 Claims, 1 Drawing Sheet

(51) Int. Cl.
*B01J 4/00* (2006.01)
*B01J 4/02* (2006.01)
*B01F 3/08* (2006.01)
*D21H 21/10* (2006.01)
*B01F 15/02* (2006.01)

(52) U.S. Cl.
CPC ........ *B01F 5/0057* (2013.01); *B01F 15/0254* (2013.01); *B01J 4/002* (2013.01); *B01J 4/02* (2013.01); *D21H 21/10* (2013.01); *B01F 2003/0896* (2013.01); *B01F 2215/0036* (2013.01)

(58) Field of Classification Search
USPC ...................................... 366/167.1
See application file for complete search history.

(56) References Cited

U.S. PATENT DOCUMENTS

| 4,289,732 | A | * | 9/1981 | Bauer | ................ | B01F 5/0471 |
| | | | | | | 239/543 |
| 5,549,792 | A | | 8/1996 | Begemann et al. | | |
| 8,916,026 | B2 | | 12/2014 | Jehn-Rendu et al. | | |
| 2001/0028999 | A1 | | 10/2001 | Saito | | |
| 2003/0192664 | A1 | | 10/2003 | Kulick et al. | | |
| 2004/0131538 | A1 | | 7/2004 | Ohzeki | | |
| 2007/0133346 | A1 | * | 6/2007 | Jacobson | ............... | B01F 3/0865 |
| | | | | | | 366/160.2 |
| 2008/0011788 | A1 | * | 1/2008 | Jacobson | ............... | B01F 5/0077 |
| | | | | | | 222/630 |
| 2009/0314702 | A1 | * | 12/2009 | Mazzei | ................ | B01F 3/0446 |
| | | | | | | 210/199 |
| 2010/0300632 | A1 | * | 12/2010 | Duggirala | ............... | D21H 17/33 |
| | | | | | | 162/164.1 |
| 2011/0305102 | A1 | * | 12/2011 | Berger | ................. | B01F 5/0405 |
| | | | | | | 366/154.1 |
| 2012/0058885 | A1 | * | 3/2012 | Nebergall | ............... | B01F 5/205 |
| | | | | | | 502/80 |
| 2014/0346248 | A1 | | 11/2014 | Huber et al. | | |
| 2014/0035338 | A1 | | 12/2014 | Huber et al. | | |
| 2015/0027651 | A1 | | 1/2015 | Jehn-Rendu et al. | | |

FOREIGN PATENT DOCUMENTS

| DE | 10 2010 028 577 A1 | 11/2011 | | |
| EP | 0 462 365 A1 | 12/1991 | | |
| EP | 0 593 171 A1 | 4/1994 | | |
| EP | 1 254 699 A1 | 11/2002 | | |
| EP | 1254699 A1 * | 11/2002 | ............... | B01F 3/02 |
| WO | WO 01/34908 A1 | 5/2001 | | |
| WO | WO 01/34910 A1 | 5/2001 | | |
| WO | WO 02/33171 A1 | 4/2002 | | |
| WO | WO 2013088031 A1 * | 6/2013 | ............... | G01M 3/22 |

OTHER PUBLICATIONS

U.S. Appl. No. 14/453,282, filed Aug. 6, 2014, US2015/0027651 A1, Jehn-Rendu, et al.
U.S. Appl. No. 14/363,433, filed Jun. 6, 2014, US2014/0353338 A1, Huber, et al.
U.S. Appl. No. 14/362,507, filed Jun. 3, 2014, US2014/0346248 A1, Huber, et al.
International Search Report dated Jan. 13, 2014 in PCT/EP2013/067834.
Office Action dated Aug. 18, 2017 in European Patent Application No. 13 756 114.8 filed Aug. 28, 2013.

* cited by examiner

METHOD AND DEVICE FOR FEEDING AT LEAST ONE CHEMICAL SUBSTANCE INTO A MAIN PROCESS STREAM

The present invention relates to a method and a device for feeding at least one chemical substance into a main process stream, especially to a method and a device for feeding at least one chemical substance into a main process stream, wherein the mass flow of the main process stream is considerably larger than the mass flow of chemical substance stream.

Mixing of two or more fluid streams is a typical step is a typical step in many industrial processes. Thus, the present invention can be used in a variety of application. As an example and also as a preferred embodiment of the method and the device of the present invention, feeding of retention chemicals and/or other additives to a pulp suspension which is fed to a paper machine in a paper or board making process will be described in more detail. Examples of customary additives which may be added to the pulp suspension are the usual papermaking additives for improving/modifying paper properties, such as fillers, sizing agents, wet and dry strength enhancers, antiblocking agents, flame retardants, antistats, hydrophobicizers, dyes and optical brighteners and also process chemicals, such as the above mentioned retention chemicals, flocculation and drainage aids, fixatives, mucilage control agents, wetters, defoamers, biocides and the like. Process chemical and fillers depend, in terms of identity and amount, in a well-known manner on the requirements of the paper machine and of the desired paper variety.

Papers and boards are produced using virgin paper stock and/or recovered paper pulp, i.e., a paper stock obtained by recycling wastepaper, or using mechanical pulp. A typical problem encountered in the production of paper or solid board is the often unsatisfactory retention property of the pulp compositions, especially when a high proportion of recovered paper and/or mechanical or thermomechanical pulp is used. Often, the drainage properties of the pulp compositions are also unsatisfactory. Therefore, retention chemicals are usually added to the pulp suspension. Retention chemicals are chemical agents which are used to bind various substances carried by the pulp suspension either to each other or specifically to the fibers of the pulp suspension in order to improve their retention in the paper web when the paper web is dewatered at the wire section in the head box of a paper machine thus reducing losses of solid substances in the papermaking process. Another economically important impact of retention chemicals involves the reduction of downtime for scheduled and unscheduled boilouts. Retention chemicals also help to keep deposit-prone materials such as pitch and sizing agents bound to fibers, reducing the chance that they end up in deposits or a spots in the product. Further retention chemicals can reduce the frequency of paper web breaks because a high load of fine materials in the paper suspension tends to make the system unstable. Any small shift in process chemistry is likely to cause the fine particles to retain more or less in the paper web sheet, changing the composition of the product. A sudden increase in fines level often means that the sheet momentarily becomes too wet, and it will likely break at an open draw.

Typically, retention chemicals have a positive overall charge in order to bind typically negatively charged pulp fibers and other additives or filler to each other thus increasing the ability of flock formation in the pulp suspension. However, negatively charged retention chemicals are also employed. Examples of retention chemicals are aluminum sulfate and polyaluminum chlorites, cationic or anionic acrylamide copolymers or combinations of two different polymers or copolymers sometimes having even different electric charges. Other examples of retention chemicals include polyethylenes and polyamines. Useful retention chemicals further include microparticulate systems of high molecular weight polyacrylamides and bentonite or colloidal silica. Useful retention aids further include combinations of microparticulate systems of high molecular weight polyacrylamides and bentonite or colloidal silica with anionic organic polymer, more particularly anionic, optionally crosslinked polyacrylamides. Retention aids based on microparticulate systems of this kind are known for example from EP 462365, WO 02/33171, WO 01/34908 or WO 01/34910. Useful retention aids also include partially hydrolyzed homopolymers of N-vinylformamide and also partially hydrolyzed copolymers of N-vinylformamide with diallyldimethylammonium chloride, N,N-dimethylaminoethylacrylamide, N,N-dimethylaminopropylacrylamide. Useful retention aids further include microparticulate systems of high molecular weight polyvinylamines and anionic, cationic or amphoteric crosslinked polyacrylamides known from US 2003/0192664 A1 for example.

The controlled dosing of retention chemicals is critical in the paper manufacturing process and in the quality of the end product. While a certain minimum addition of retention chemicals is required to achieve the goals described above, an excessive dosing of the retention chemical results in flocks in the end product which are seen as uneven quality of the product and has therefore to be avoided.

A common problem encountered with retention chemicals is hydrolysis, where the chemicals in question react with water and tend to loose their efficiency. Thus, if the feeding of the retention chemical to the paper pulp could be optimized so that the chemical in question would be in contact with water for as short a time as possible, considerable savings could be made in chemical costs alone. Further, hydrolysis results in charge changes in time which may cause dissolving of the flocks which have already been formed, thus weakening the efficiency of the chemical. An additional impact to flock stability has also the shearing forces. On the way to the headbox the flocculated pulp suspension are subject to shearing forces which leads to breaking the flocks with the time. Therefore, the feeding of the retention chemical to the paper pulp should be optimized so that the chemical can be introduced in a location as close to the headbox of the paper machine as possible.

However, up to now, no adequate technical solution exists, which allows both homogenous and quick mixing of retention chemicals to the paper pulp suspension.

In order to achieve homogenous mixing, the retention chemical is usually mixed with the pulp way upstream in the feed pipeline of the headbox in order to ensure a long enough mixing time before the headbox is reached, e.g. in the feed pump, in the machine screen or immediately after the machine screen. This has, however, the drawback that the retention chemical has lost some of its efficiency for example for the reasons mentioned above. As loss in efficiency has to be compensated by overdosing, the quality of the end product may suffer.

Several different prior art methods and apparatus are known for feeding both retention chemicals and other additives the pulp suspension. For instance, in conventional paper stock manufacturing methods, both the various paper pulp fiber fractions and the additives, fillers, adhesives etc. required in the manufacture process are fed to a mixing tank in the so-called short circulation. From the mixing tank the paper pulp is pumped by means of the headbox feed pump towards the head box in most cases via vortex cleaning, gas separation and a headbox screen or the so-called machine screen. Both the feed pump and the headbox screen mix the pulp further, in other words they keep the paper pulp as homogenous as possible. In most cases, a retention chemical (or, if part of the retention chemicals is already introduced in the mixing tank, the main part of retention chemicals) is fed to the paper pulp after the headbox screen in order to ensure the retention of additives, fillers or adhesives of the pulp suspension in the wire section of paper machine.

Another problem encountered with feeding retention chemicals or other additives to the main pulp suspension stream is based on the fact that such additives are usually dosed in very small volumes as compared to the main mass flow. Feeding a small volume to a large volume homogenously requires an efficient mixing at the feeding location. If the mixing is poor, the chemical gets in contact with a small portion of the pulp suspension only which results in variations of the properties of the end product.

Further, for reasons explained above, retention chemicals cannot be stored as a diluted solution which is immediately ready for use. Rather, a concentrate stream of the retention chemical is usually prepared which can be stored for a couple of hours at least. According to one prior art method, concentrated stream of the retention chemical is provided. Immediately prior to mixing with the pulp suspension, a diluent is fed into the concentrated stream. Afterwards the diluted retention chemical stream is injected into the d main process stream, i.e. the pulp suspension. In order to ensure a homogenous mixing, the diluted stream of the retention chemical is usually injected upstream of a feed pump or a mechanical mixer into the main process stream feeding of the headbox. However, in order to ensure efficient and homogenous mixing, mechanical mixers or feed pumps generally develop strong shear forces, which might breaks weak chemicals such as polymer chains of some retention chemicals. In addition mechanical mixers are costly and entail high operating costs.

From documents U.S. Pat. No. 4,289,732 A, EP 1 254 699 A1 and US 2004/131538 A1, it is known to use jet nozzle for mixing two fluids where the mixing chamber is connected to a pipe for the mixed fluid stream. These documents do not concern mixing or pre-mixing of two fluids which are fed into a third stream, namely a main process stream. In document U.S. Pat. No. 2,645,463 A, an apparatus for continuous flow mixing of three fluids is described. This document does not disclose or suggest the use of jet nozzles for this purpose. Document US 2001/028999 A1 describes mixing of three fluids in a common mixing chamber. None of these documents refers to pulp processing.

German Utility Model DE 92 05 111 U1 describes mixing means for mixing two liquids at a constant flow rate for supplying a headbox of a paper machine.

US 2008/0011788 A1 describes a method for feeding one or more chemicals into a papermaking process, more specifically, a method for feeding chemistry, e.g. one or more chemicals such as a retention aid and a feeding liquid, into a thick stock of a papermaking process. US 2008/0011788 A1 does not use a jet or spray nozzles for this purpose. Rather, the chemicals and the feeding liquid are mixed in a mixing chamber comprising a central feeding spike having radial openings for feeding one liquid into the other liquid which surrounds the feeding spike.

U.S. Pat. No. 5,549,792 A describes a headbox of a paper machine comprising a pulp distributer which includes a turbulence insert.

The technical problem to be solved by the present invention is therefore to provide a method and a device for feeding at least one chemical substance into a main process stream which overcomes the problems of prior art described above. Specifically, the method of the present invention shall allow a homogenous and quick mixing of the chemical substance into the main process stream without requiring additional mechanical mixers in the main process stream. The invention shall allow efficiently mixing of two streams of considerably different mass flow. Specifically in the context of adding retention chemicals or other additives to a pulp suspension stream, the method and the device of the invention shall avoid problems associated with an addition of such substances far upstream of the headbox, such as hydrolysis of different chemicals, changes of the electrical properties of the retention chemicals, shear-induced degradation of already formed flocks, etc. Further, the method and the device of the invention shall avoid high investment and operating costs associated with additional mechanical mixers. It should also be possible to adapt the method and the device of the invention to existing industrial installations.

This technical problem is solved with the method and the device as defined in the annexed patent claims. Preferred embodiments of the invention are subject to the depended claim.

Accordingly, the present invention concerns a method of feeding at least one chemical substance into a main process stream comprising the steps of providing a concentrated stream of said chemical substance, mixing said concentrated stream with a diluent stream to provided a diluted stream of said chemical substance, injecting said diluted stream of said chemical substance into said main process stream, wherein said mixing of said concentrated stream with said diluent stream is effected by injecting a jet of either one of said concentrated stream or said diluent stream into the respective other stream. I.e. either the concentrated stream is injected as a jet into the diluent stream or the diluent stream is injected as a jet into the concentrated stream.

It has surprisingly been found a pre-dilution of the concentrate stream using a jet results in a very effectively mixed diluted stream which is ultimately injected into the main process stream. The improved homogeneously mixed diluted stream results in more homogenous and quick mixing of the diluted stream and the main process stream so that mechanical mixers or shear generating feed pumps required in prior art downstream of the injection point can be avoided.

In the broadest sense, a jet of one stream is a jet which extends into the other stream without being immediately carried with the other stream. In cases where there is no effect of surrounding geometry on the jet, such jets are denoted jets. In pipe systems used to carry fluid streams in industrial plants, such jets are usually confined and influenced by surrounding geometry. A jet is not immediately carried with the other stream if the jet has room for expansion and not impinges the wall surrounding the orifice. This can be established by relying on design rules usually referred to as jet in crossflow by using a mean outlet velocity carrying enough momentum to allow for full flow separation at the edges of the orifice.

The angle between the longitudinal axis of the flow direction of the concentrate stream and the longitudinal axis of the flow direction of the diluent stream at the injection site defines the injection angle. In case of e.g. a cone-shaped stream, the longitudinal axis is the center axis of the cone. The injection angle of the jet is not particularly limited. Preferably, however, said jet is injected at an injection angle such that the flow direction of the concentrated stream and the flow direction of the diluent stream comprise an angle in the range of 15° to 90°. An angle of approximately 45° is particularly preferred. In such a configuration, backpressure in the concentrate and diluent pipelines will not be increased so that the method can easily be employed in existing industrial installation without requiring investments in new pumps etc.

The jet can be established by injecting a sufficiently high mass stream through a small orifice in a pipe. More preferably, however, said jet is established by injecting either of said concentrated stream or said diluent stream into the respective other stream through a nozzle, e.g. a jet nozzle or a spray nozzle. The term spray nozzle has to be construed broadly and is intended to refer to any nozzle capable of producing a defined jet of a first fluid which is injected into a second fluid. It is not required, albeit possible, that the nozzle causes atomization of the first fluid, i.e. the breakup of the fluid into small drops. Preferably, the nozzle has a spray angle comprised in the range of 10° to 120°, more preferably a spray angle of approximately 15°. After leaving the nozzle orifice, a jet of the first fluid is formed which has a well defined outer boundary. In this respect, the term "spray angle" refers the angle formed by the first fluid, e.g. by a cone of liquid, leaving a nozzle orifice.

The spray angle is preferably selected such that the injected jet essentially covers the diameter of the respective other stream. Consequently, the other stream has to pass through the jet resulting in a thorough mixing of both streams.

While in principle either stream can be injected as a jet into the other, usually the diluent stream will have lower viscosity than the concentrated stream so that it is preferred to inject the diluent stream into the concentrated stream of said chemical substance.

The diluent stream may be any suitable diluent to dilute the concentrated stream of the chemical substance. In the broadest sense, the diluent stream, concentrate stream and main process stream can be regarded as any suitable fluids so that the invention essentially relates to an effective pre-mixing of a first and a second stream before introducing the mixed stream into a third main stream. More specifically, however, the pre-mixing is in fact a dilution step. In many applications, especially in the paper making process, fresh water or process water can be used as diluent for a concentrated stream of retention chemical/additive. As a particular advantage of the present invention, however, due to the high shear forces generated by the jet, the diluent stream can even be created by diverting a portion from said main process stream without risking any digestion in the pre-mixing arrangement, even if the main process stream is, for instance, a pulp suspension.

It is preferred to inject the diluted stream also in form a jet into the main process stream.

Often, the mass flow of the main process stream will be considerably larger, e.g. 500 to 5000 times larger than the mass flow of the concentrated stream of the chemical substance. In such cases it is preferred to inject more than one diluted stream into said main process stream. For instance, two diametrically opposite injections points at the main process pipe may be employed, each injecting the diluted stream into one half of the total cross sectional area of the main process pipe.

If more than one injection of diluted streams are employed, it is preferred that said diluted streams are injected into the main process stream at locations which at locations which are offset with respect to each other in order to reduce or avoid interference between those injected jets. It has been found that a particularly quick and homogenous mixing of the diluted streams with the main process streams is achieved if the injections sites for the diluted streams are distributed circumferentially around the pipe of the main process stream while providing for an eccentric injection path so that injected jets are not directed towards each other. Alternatively or additionally, the injection sites can also be offset with respect to each other in the flow direction of the main process stream.

The mean velocity of the injected diluted stream is preferable adjusted such that the center path line of the injected jet within the main process stream reaches the center of area of the respective cross section of the main process stream to be fed by each jet, at a distance downstream of the injection point which corresponds to the diameter of the total cross section of the main process stream. For instance, in case of a circular main process pipe, the center of area of the respective cross section of the main process stream to be fed by each jet would be the center of the circular cross section of the pipe in case of a single injected jet. In case of two diametrically opposed injected jets, the center of area would be the center of area of each half circle of the cross section.

The present invention can be applied to a variety of mixing processes in chemical plants or other industrial processes. Most preferably, however, the present invention is applied to paper and board manufacturing processes where the main process stream comprises a pulp suspension and said chemical substance comprises a retention chemical, especially one or more of the retention chemicals mentioned above.

The present invention also concerns a device for carrying out the method of the invention.

Accordingly, the device of the invention for feeding at least one chemical substance into a main process stream, comprises a first pipe segment having a first inlet for a first fluid and a first outlet for a mixed fluid, a second pipe segment having a second inlet for a second fluid and a second outlet connected to and leading into said first pipe segment between said first inlet and said first outlet, and first connection means for connecting said first outlet of said first pipe section to a main pipe of said main process stream. According to the invention, the second pipe segment comprises at least one nozzle for generating a jet of said second fluid arranged upstream of said second outlet.

Preferably said nozzle for generating a jet of said second fluid is a jet nozzle or a spray nozzle. The nozzle can for instance be a flat fan nozzle, a hollow cone nozzle or a full cone nozzle. The spray angle of said nozzle is preferably comprised in the range of 10° to 120°, more preferably the spray angle is approximately 15°.

Said second pipe segment is preferably connected to said first pipe segment at an angle comprised in the range of 15° to 90°, preferably at an angle of approximately 45°.

The distance between the nozzle opening and the center of the other stream should be in the range of 10 to 30 times the diameter of the nozzle.

According to a preferred embodiment, said first connection means comprises an injection nozzle for injecting a jet of said mixed fluid into said main process pipe. Preferable, the connection means comprise a first exchangeable connection flange housing the injection nozzle so that the device of the invention can be readily adapted to existing pipes and to different applications and operating conditions. The injection nozzle can be made as insert so that the same connection flange can be used for different nozzles.

Preferable, said second inlet of said second pipe segment comprises second connections means for connecting said second pipe segment to a feed pipe for said second fluid.

Said second connection means preferably comprises a second exchangeable connection flange housing said nozzle for generating a jet of said second fluid.

In the following, a preferred embodiment of the method and the device according to the invention will be described in more detail making reference to the appended drawings.

IN THE DRAWINGS

Figure 2:
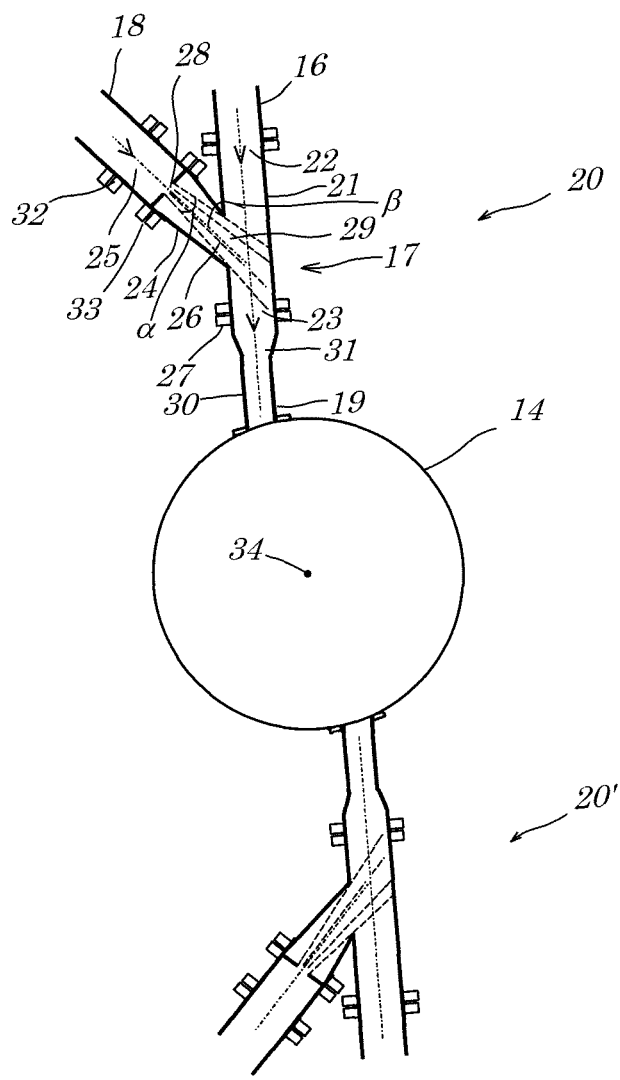

FIG. 1 is a very schematic drawing of a paper machine fed with a pulp suspension through a main process pipe; and FIG. 2 depicts a device according to a preferred embodiment of the invention for feeding a retention chemical to the pulp suspension, shown in a cross-sectional view perpendicular to the main process pipe.

FIG. 1 depicts very schematically a paper machine 10 which is merely exemplified by a headbox 11, a roll 12 and a paper web 13. The headbox 11 is fed with a pulp suspension via a main process pipe 14. The usual water circulation, suspension preparation and mixing tanks, pumps, filters, gas separation tanks etc. used in the paper manufacturing process are not depicted for the sake of simplicity. A retention chemical is prepared as concentrate solution in a concentrate tank 15 and fed via concentrate feed pipe 16 towards main process pipe 14. Before reaching the main process pipe 14, the concentrated solution is diluted at a pre-mixing point 17 by injecting a diluent stream vial diluent line 18 into the concentrate stream. The diluent line 18 can be connected to a water supply or can be branched off from main process line 14. The diluted stream is fed to the main process pipe 14 via pipe segment 19.

In FIG. 2, a device according to a preferred embodiment of the invention for feeding a retention chemical the pulp suspension is described in more detail. Specifically, the device of the invention is installed at the pre-mixing point 17 of the scheme of FIG. 1 for diluting the concentrate stream of the retention chemical.

The device of the invention is generally denoted by reference sign 20 and comprises a first pipe segment 21 having a first inlet 22 for the concentrated retention chemical stream which is connected to concentrate feed pipe 16 and a first outlet 23 for the diluted retention chemical which is connected via pipe 19 to the main process pipe 14 which is depicted in a cross-sectional view. A second pipe segment 24 is permanently connected to the first pipe segment 21 at an injection angle β of 45° and has a second inlet 25 for a diluent which is connected to diluent feed pipe 18 and a second outlet 26 which leads into the first pipe segment 21 between said first inlet 22 and said first outlet 23. First connection means 27 are provided for connecting the first outlet 23 of the first pipe section 21 to the main pipe 14 of the main process stream.

The second pipe segment 24 comprises at least one spray nozzle 28 for generating a jet 29 of the diluent stream which is injected into the concentrated stream of the retention chemical. The spray nozzle 28 is arranged upstream of the second outlet 26. In the present case, the nozzle is a flat fan nozzle generating a spray angle α of approximately 15°.

The first connection means 27 comprises an exchangeable connection flange 30 housing an injection nozzle 31 for injecting a jet of said mixed, diluted fluid into said main process pipe 14. The injection nozzle can be made as insert so that the same connection flange can be used for different nozzles.

The second inlet 25 of said second pipe segment 24 comprises second connections means 32 for connecting said second pipe segment to the diluent feed pipe 18. The second connection means comprise a second exchangeable connection flange 33 which houses the spray nozzle 28 for generating a jet of the diluent stream.

In the embodiment of FIG. 2, two identical devices 20, 20' are used to inject diluted streams of retention chemicals into the main process pipe 14. As can be taken from the drawing, rather than being both directed towards the center 34 of the main process pipe 14, the devices 20, 20' are eccentrically arranged so that that the jets of diluted fluid injected into the main process stream do not directly point at each other. The device 20' is identical to device 20 and will therefore not be explained in further detail here.

Due to effective pre-mixing when diluting the concentrated stream of retention chemical, it is possible to reduce the diluent stream by 50 to 70% thus minimizing costs for diluent water and reducing associated investment and operating costs for pumps and pipeline configuration. Despite the reduced diluent stream, an effective mixing of the diluted retention chemical stream with the pulp suspension of the main process stream can be achieved which allows the injection point to be transferred closer to the headbox. Thus loss of efficiency of the retention chemical is prevented and the total amount of retention chemical can also be reduced. Further, the injection point can be optimized to allow for sufficient time for flock formation while prevention flock degradation due to shear forces in the pipe leading to the headbox.

The invention claimed is:

1. A method of feeding at least one chemical substance into a main process stream of a paper making process, the main process stream comprising a pulp suspension, the method comprising:
   mixing a concentrated liquid stream of at least one chemical substance selected from the group consisting of a retention chemical and other additive for improving and/or modifying paper properties with a diluent liquid stream to obtain a diluted liquid stream of said chemical substance; and
   injecting a jet of said diluted liquid stream of said chemical substance into a main process stream comprising a pulp suspension,
   wherein said mixing of said concentrated liquid stream with said diluent liquid stream is effected by injecting a jet of either one of said concentrated liquid stream or said diluent liquid stream into the respective other stream at an injection angle of from 15° to 90° through a nozzle having a spray angle in the range of 10° to 120° selected such that said spray angle of said injected jet essentially covers the diameter of said respective other stream, and
   wherein said diluent liquid stream is not supplied by diverting a portion from said main process stream.

2. The method of claim 1, wherein said diluent liquid stream is injected into said concentrated liquid stream of said chemical substance.

3. The method of claim 1, wherein more than one diluted liquid stream is injected into said main process stream.

4. The method of claim 3, wherein said more than one diluted liquid stream is injected into the main process stream at locations which are offset with respect to each other.

5. A device for feeding at least one chemical substance into a main process stream of a paper making unit,
   the main process stream comprising a pulp suspension;
   the device comprising:

a first pipe segment having a first inlet for a first fluid and a first outlet for a mixed fluid;

a second pipe segment having a second inlet for a second fluid and a second outlet connected to and leading into said first pipe segment between said first inlet and said first outlet, wherein said second pipe segment is connected to said first pipe segment at an injection angle of from 15° to 90°; and a first connector for connecting said first outlet of said first pipe segment to a main pipe of said main process stream, wherein said first connector comprises a first exchangeable connection flange housing an injection nozzle for generating a jet of said mixed fluid, wherein said second pipe segment comprises at least one spray nozzle having a spray angle in the range of 10° to 120° for generating a jet of said second fluid arranged upstream of said second outlet, said spray angle being selected such that spray angel of said injected jet essentially covers the diameter of said respective other stream, and wherein said second fluid is not supplied to the second pipe segment from said main pipe.

6. The device of claim 5, wherein said spray nozzle is a flat fan nozzle, a hollow cone nozzle or a full cone nozzle.

7. The device of claim 5, wherein said second inlet of said second pipe segment comprises a second connector for connecting said second pipe segment to a feed pipe for said second fluid.

8. The device of claim 7, wherein said second connector comprises a second exchangeable connection flange housing said spray nozzle for generating a jet of said second fluid.

9. The device of claim 5, wherein the spray angle of said spray nozzle is approximately 150.

10. The device of claim 5, wherein said second pipe segment is connected to said first pipe segment at an injection angle of approximately 45°.

11. The device of claim 5, wherein the distance between said spray nozzle opening and the center of the other stream is 10 to 30 times the diameter of said spray nozzle.

* * * * *

UNITED STATES PATENT AND TRADEMARK OFFICE
CERTIFICATE OF CORRECTION

PATENT NO. : 10,252,228 B2
APPLICATION NO. : 14/423857
DATED : April 9, 2019
INVENTOR(S) : Marko Petteri Kajasvirta et al.

Page 1 of 1

It is certified that error appears in the above-identified patent and that said Letters Patent is hereby corrected as shown below:

In the Specification

Column 8, Line 12, "that that" should read --that--.

In the Claims

Column 10, Line 13, "approximately 150" should read --15°--.

Signed and Sealed this
Eleventh Day of February, 2020

Andrei Iancu
*Director of the United States Patent and Trademark Office*